H. E. LANCASTER.
HARROW ATTACHMENT FOR CULTIVATORS.
APPLICATION FILED MAR. 24, 1913.

1,079,566.

Patented Nov. 25, 1913.

2 SHEETS—SHEET 1.

Witnesses
L. B. James
C. E. Hunt

Inventor
Harris E. Lancaster
By H. B. Willson &co
Attorneys

H. E. LANCASTER.
HARROW ATTACHMENT FOR CULTIVATORS.
APPLICATION FILED MAR. 24, 1913.
1,079,566.
Patented Nov. 25, 1913.
2 SHEETS—SHEET 2.
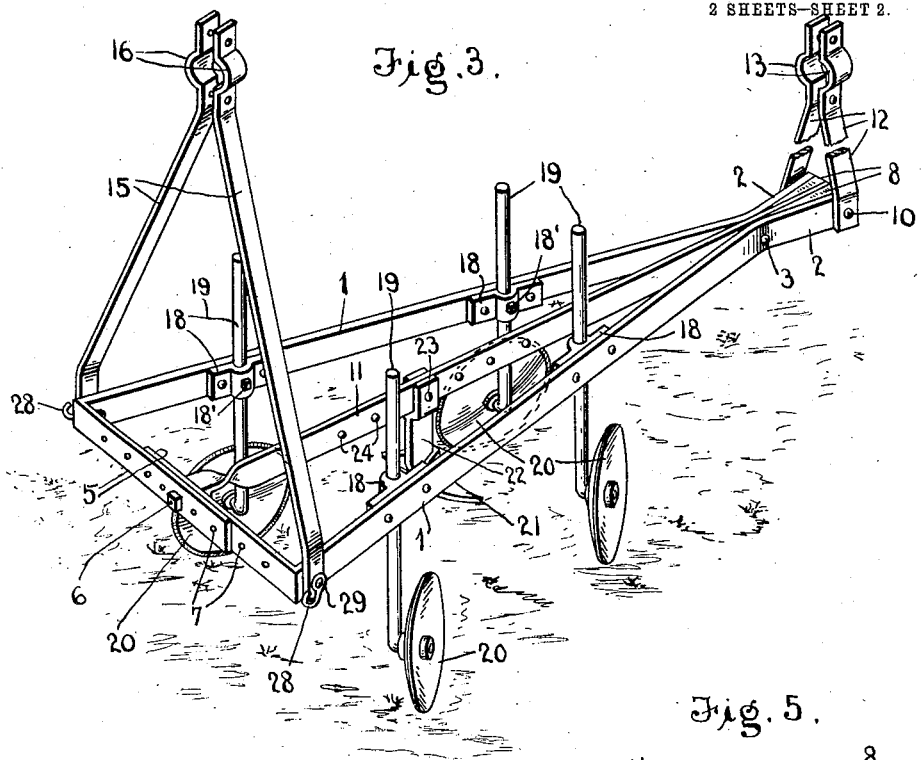
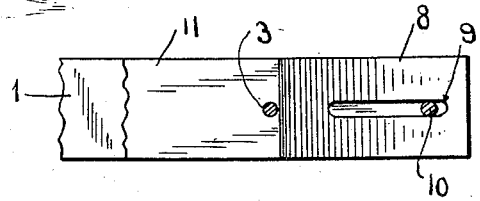
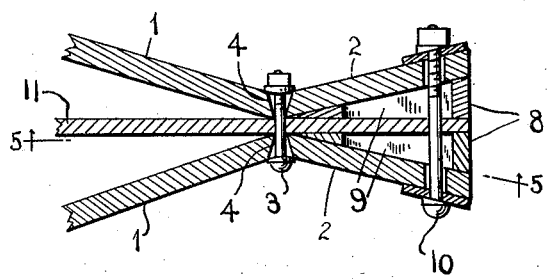
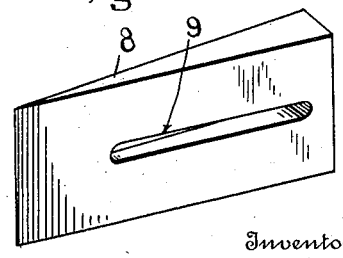
Witnesses
L. B. James
C. E. Hunt
Inventor
Harris E. Lancaster
By H. B. Willson & Co.
Attorneys

UNITED STATES PATENT OFFICE.

HARRIS E. LANCASTER, OF ADAMSVILLE, TEXAS.

HARROW ATTACHMENT FOR CULTIVATORS.

1,079,566. Specification of Letters Patent. Patented Nov. 25, 1913.

Application filed March 24, 1913. Serial No. 756,451.

*To all whom it may concern:*

Be it known that I, HARRIS E. LANCASTER, a citizen of the United States, residing at Adamsville, in the county of Lampasas and State of Texas, have invented certain new and useful Improvements in Harrow Attachments for Cultivators; and I do declare the following to be a full, clear, and exact description of the invention, such as will enable others skilled in the art to which it appertains to make and use the same.

This invention relates to improvements in harrow attachments for straddle row cultivators.

One object of the invention is to provide an attachment of this character adapted to be secured to the beams of a cultivator in place of the shovels or blades thereof whereby the soil is pulverized and leveled, the grass and weeds destroyed and a deep dust mulch formed between the rows of plants by which the latter are greatly benefited and the growth thereof stimulated.

Another object is to provide a harrow attachment for cultivators which will be simple and inexpensive in construction, efficient in operation and which may be adjusted to vary the space between the soil engaging devices thereof.

With these and other objects in view, the invention consists of certain novel features of construction and the combination and arrangement of parts as will be more fully described and claimed.

Figure 1:
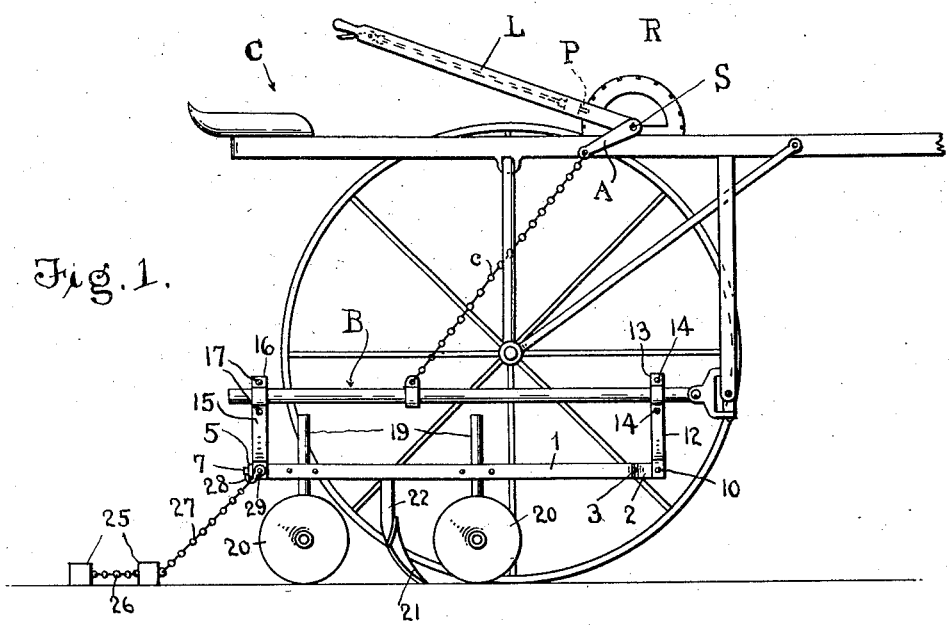
Figure 2:
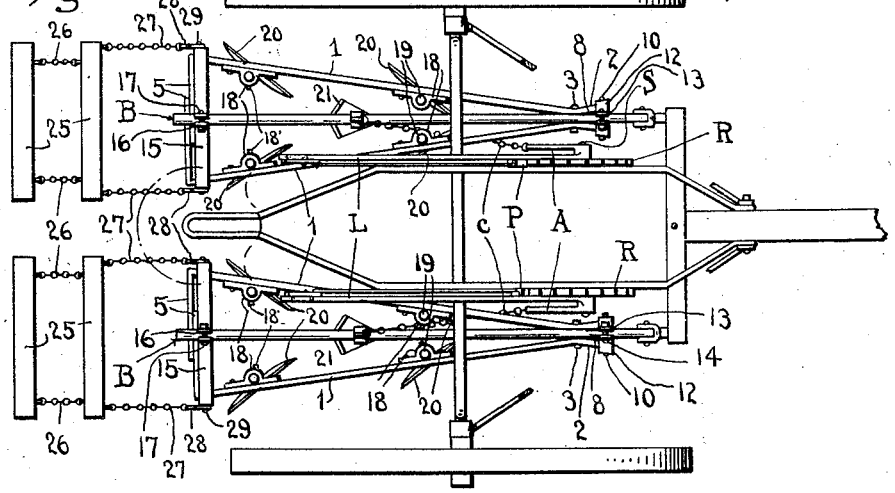

In the accompanying drawings: Figure 1 is a side view of a straddle row cultivator showing my improved harrow attachment applied thereto, the near supporting wheel of the cultivator being removed; Fig. 2 is a top plan view of the same. Fig. 3 is a detail perspective view of one of my improved harrow attachments; Fig. 4 is a detail horizontal sectional view of the outer end of the beams of the attachment illustrating the construction and operation of the tapered wedge blocks employed to fill the spaces between said ends of the beams; Fig. 5 is a longitudinal sectional view taken on the line 5—5 of Fig. 4; Fig. 6 is a detail perspective view of one of the wedge blocks.

In the present embodiment of the invention the same is shown as applied to a straddle row cultivator C which may be of any desired construction having the usual beams B which in the ordinary use of the machine carry the shovels or ground engaging devices, said devices being removed in the present instance and in place thereof is arranged my improved harrow attachment which will be hereinafter described. The beams B may be connected at their forward ends to the frame of the machine in the usual or any suitable manner to permit the beams and the parts carried thereby to be swung upwardly to inoperative position. The usual or any suitable means may be employed for raising the beams and the parts attached thereto, said means being here shown as rock shafts S having fixed thereon short crank arms A which are connected by chains c to the beams B of the cultivator. Also fixed to the shafts S are hand levers L which extend back in position to be conveniently reached by the driver from his seat on the machine. The levers L are provided with suitable pawls P for engagement with segmental racks R whereby the levers may be locked and the shafts S thus held to support the beams and the parts attached thereto in the positions to which they have been elevated.

As hereinbefore stated the foregoing parts may be of any suitable construction and do not form a part of the present invention which comprises attachments for harrowing, weeding, pulverizing and mulching the soil between the rows of plants.

In carrying out the invention, I provide two attachments one of which is to be applied to each beam of the cultivator and as said attachments are exactly alike, a description of one will suffice for both.

Each of the attachments comprises longitudinally disposed side bars or beams 1 which may be constructed of any suitable material but which are preferably in the form of metal bars, bent outwardly near their forward ends as shown at 2, said bars being loosely connected at the points where the same are bent by a bolt 3 which is engaged with flared or tapered holes 4 formed in the bars as clearly shown in Fig. 4 of the drawings. When thus connected the bars 1 diverge from their point of connection toward their rear ends while the short forward ends of the bars diverge from their point of connection as shown. The rear ends of the bars are bent inwardly at right angles forming arms 5 which overlap and are adjustably connected to permit said ends to be spread to a greater or less distance apart and are fastened in their adjusted positions by a bolt 6 which is engaged with bolt holes 7, a series of which are formed in each of the arms 5 as shown. The short forward ends of the side bars are spaced apart and held in the position to which they are moved when the rear ends of the bars are adjusted by wedge shaped spacing blocks 8 which are disposed between the forward ends of the bars and each of which is provided with a longitudinally extending slot 9 with which is engaged a connecting bolt 10 arranged through the forward ends of the bars as shown. The blocks 8 are disposed on opposite sides of a central plow supporting bar or beam 11 which is arranged between the side bars 1 and has its forward end secured to said side bars by the bolts 3 and 10. The rear end of the bar 11 is twisted or given a half turn and bent downwardly at right angles to form an attaching lug with which the bolt 6 is engaged whereby said rear end of the bar 11 is securely fastened to the rear end arms 5.

Secured to the forward ends of the side bars 1 by the bolt 10 is a pair of front hanger bars 12 which extend upwardly for a suitable distance and converge or incline toward each other as shown. The upper ends of the bars 12 are bent upwardly at an angle to the main portion thereof and said upwardly bent ends are bent outwardly to form clips 13 which are adapted to fit around the forward end of the cultivator beam B to which said clips or upper ends of the bars 12 are fastened by bolts 14 or other suitable fastening devices as shown. Bolted or otherwise secured at their lower ends to the rear ends of the side bars 1 are rear hanger bars 15 which converge or incline inwardly toward their upper ends and have formed thereon clips 16 which are adapted to be engaged with and fastened to the rear end of the cultivator beam B by bolts or similar fastening devices 17. By thus attaching the side bars or frame of the attachment to the beams of the cultivator, said frames will be moved with the beams when the latter are raised or lowered in the manner described.

Secured to the inner side of each of the side bars 1 of the machine are clips 18 with which are adjustably engaged with standards 19 of a series of harrow disks 20 or other suitable ground working devices by means of which the soil between the rows of plants is worked in the manner described. The standards 19 are secured in the clips 18 to support the disks at the desired position by set screws 18' as clearly shown in Fig. 3 of the drawings.

In addition to the harrow disks 20 the attachment is also preferably provided with a plow 21 the standard 22 of which has a forked or bifurcated upper end which is adjustably secured to the central bar or beam 11 of the attachment by a bolt 23 which is engaged with registering apertures in the forked upper end of the standard and with one of a series of bolt holes 24 formed in the bar 11 whereby the plow may be fastened to said bar at any desired position along the length of the same and between the harrow disks 20.

In addition to the harrow disks and plow I also preferably provide a drag by means of which the soil is more thoroughly pulverized and leveled after being worked by the harrow disks and plow and which comprises two or more harrow bars 25 which are spaced suitable distances apart and are loosely connected by short chains or other flexible connecting elements 26. The front drag bar is attached to the rear end of the side bars 1 of the harrow attachment by draft chains 27 which are of suitable length to permit the bars to lie flat on the ground when dragged behind the device and which have their forward ends detachably engaged with hooks 28 secured to the rear ends of the side bars 1 preferably by bolts 29.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A harrow attachment for cultivators comprising side bars loosely connected near one end, with the ends of each bar flaring from their point of connection, arms at the free ends of the longer portions of said bars extending inwardly toward each other and overlapping, means for adjustably connecting said arms, harrows mounted on said side bars, and means for holding the shorter flared portion of said bars rigidly in adjusted position.

2. A harrow attachment comprising side bars having outwardly flared apertures near one end, a bolt extending loosely through said apertures and connecting said side bars, the short ends of said bars being bent outwardly from said connecting bolt, spacers arranged between the outwardly bent forward ends of said bars, means for adjustably securing said spacers in adjusted position, means for adjustably connecting the rear ends of said bars, and harrows mounted on said side bars.

3. A harrow attachment comprising side bars having outwardly flared apertures near one end, a bolt extending loosely through said apertures and connecting said side bars, the shorter ends of said bars being bent outwardly from said connecting bolt, wedge shaped blocks arranged between the flared ends of said bars and having longitudinal slots therein, bolts extending through said bars and the slots in said blocks to secure said blocks in adjusted position, means for detachably connecting the rear ends of said bars, and harrows mounted on said side bars.

4. A harrow attachment for cultivators comprising side bars loosely connected near their forward ends whereby the rear ends of the bars may be adjusted to a greater or less distance apart, said forward ends of the bars being bent outwardly, end bars at the rear ends of the side bars, and having an overlapping engagement, means to adjustably connect the overlapping ends of said bars whereby the rear ends of the side bars are adjusted to greater or less distances apart and held in their adjusted positions, wedge shaped spacing blocks arranged between the outwardly bent forward ends of said side bars and having therein longitudinal slots, a fastening bolt engaged with said forward ends of the side bars and with the slots in said spacing blocks, a series of standards adjustably secured to the side bars of the frame, harrow disks carried by said standards, hanger bars secured at their lower ends to the ends of said side bars, and clips formed on the upper ends of said hanger bars and adapted to be engaged with the beams of the cultivator.

In testimony whereof I have hereunto set my hand in presence of two subscribing witnesses.

HARRIS E. LANCASTER.

Witnesses:
  E. N. WOLF,
  ROY DAVIS.

---

Copies of this patent may be obtained for five cents each, by addressing the "Commissioner of Patents, Washington, D. C."